(12) United States Patent
Morgan et al.

(10) Patent No.: US 8,423,704 B2
(45) Date of Patent: Apr. 16, 2013

(54) DYNAMIC OPTIMIZATION OF MEMORY USE IN A DIGITAL RECORDING DEVICE

(75) Inventors: Margaret B. Morgan, Austin, TX (US); David W. Zysk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/049,071

(22) Filed: Mar. 14, 2008

(65) Prior Publication Data

US 2009/0231466 A1    Sep. 17, 2009

(51) Int. Cl.
*G06F 12/00*    (2006.01)

(52) U.S. Cl.
USPC ...... 711/103; 711/159; 711/170; 348/207.99; 382/239

(58) Field of Classification Search ................... 711/103, 711/159, 170; 348/207.99; 382/239
See application file for complete search history.

(56) References Cited

U.S. PATENT DOCUMENTS

| | | | |
|---|---|---|---|
| 5,249,053 A * | 9/1993 | Jain | 348/207.99 |
| 6,539,169 B1 | 3/2003 | Tsubaki et al. | |
| 6,885,395 B1 | 4/2005 | Rabbani et al. | |
| 7,197,189 B2 * | 3/2007 | Adelmann | 382/239 |
| 2002/0118285 A1 * | 8/2002 | Misawa et al. | 348/208.16 |
| 2006/0274157 A1 | 12/2006 | Levien et al. | |

* cited by examiner

*Primary Examiner* — Matthew Bradley

(74) *Attorney, Agent, or Firm* — Cahn & Samuels, LLP

(57) ABSTRACT

A method for dynamically optimizing the memory use in a digital recording device. The disclosed method includes recording a plurality of digital files collected by said digital recording device on a recording medium and assigning each file of said plurality of recorded digital files a priority ranking of high, medium or low based on at least one predetermined criteria. The method also includes recording additional digital files on the recording medium and compressing the files assigned a low priority ranking when the recording medium reaches a first predetermined threshold of the recording medium's total storage capacity. The method further includes compressing the files assigned a medium priority ranking when the recording medium reaches a predetermined threshold in the recording medium's total storage capacity and deleting files designated as low priority files when the recording medium reaches a predetermined threshold in the recording medium's total storage capacity.

14 Claims, 3 Drawing Sheets

DYNAMIC OPTIMIZATION OF MEMORY USE IN A DIGITAL RECORDING DEVICE

I. FIELD OF THE INVENTION

This invention relates to a method for dynamically optimizing the memory use in a digital recording device.

II. BACKGROUND OF THE INVENTION

With the advent of digital recording technologies and quickly expanding size of digital files that are maintained or managed on the actual digital recording device, a user is often confronted with a dwindling capacity to record or store files as the devices storage medium begins to fill. Generally, a user must alter or delete at least some of the existing files to make room for new digital recordings. Users have two scenarios that they wish to avoid. Deleting recorded images or files when the device memory has space remaining, or having a memory that is filled to capacity and cannot accommodate additional recording, when there is additional recording the user wishes to do.

Traditionally, a user must, at least temporarily, cease capturing and creating digital recording, images, music or any combination thereof and manually replace the memory card, or manually delete files and/or recordings from the memory card coupled to the digital recording device. This is generally inefficient and in a dynamic environment, opportunities for picture taking or recording can be missed.

III. SUMMARY OF THE INVENTION

Disclosed is a system for dynamically optimizing the memory use in a digital recording device. The disclosed system includes recording a plurality of digital files collected by said digital recording device on a recording medium and assigning each file of said plurality of recorded digital files a priority ranking of high, medium or low based on at least one predetermined criteria. The system employs recording additional digital files on the recording medium and compressing the files assigned a low priority ranking when the recording medium reaches a predetermined threshold of the recording medium's total storage capacity. When the recording medium reaches yet another predetermined threshold in the recording medium's total storage capacity, the system compresses files assigned a medium priority ranking. When the recording medium reaches yet another predetermined threshold in the recording medium's total storage capacity the system responds by deleting files designated as low priority files.

Also disclosed is a method for dynamically optimizing the memory use in a digital recording device. The disclosed method includes recording a plurality of digital files collected by said digital recording device on a recording medium and assigning each file of said plurality of recorded digital files a priority ranking of high, medium or low based on at least one predetermined criteria. The method also includes recording additional digital files on the recording medium and compressing the files assigned a low priority ranking when the recording medium reaches a first predetermined threshold of the recording medium's total storage capacity. The method further includes compressing the files assigned a medium priority ranking when the recording medium reaches a predetermined threshold in the recording medium's total storage capacity and deleting files designated as low priority files when the recording medium reaches a predetermined threshold in the recording medium's total storage capacity.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the method should become evident to a person of ordinary skill in the art.

IV. BRIEF DESCRIPTION OF THE DRAWING

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for purposes of illustration. A person skilled in the relevant art will recognize that other components and configurations may be used without departing from the spirit and scope of the invention.

Figure 1:
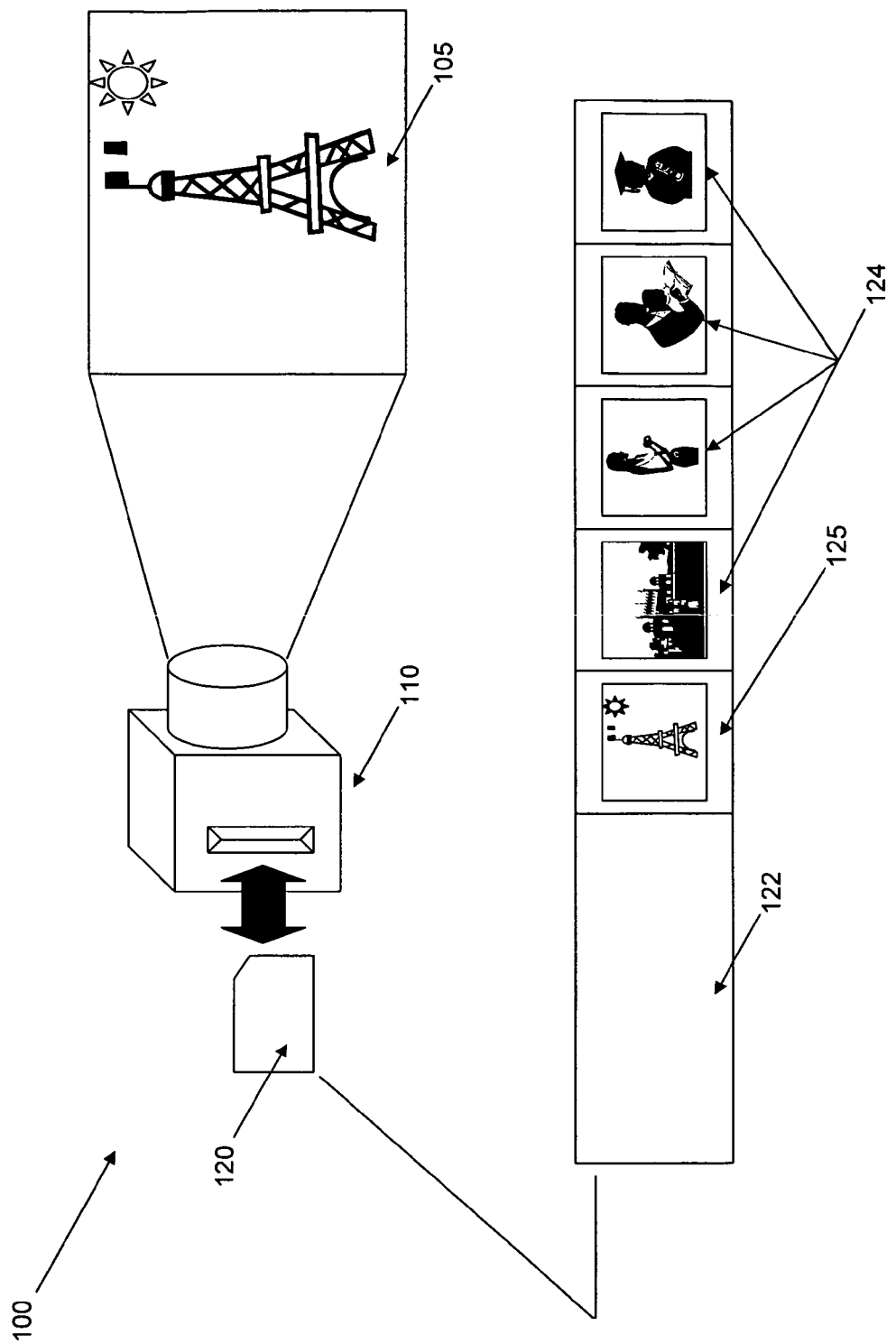
FIG. 1 illustrates an exemplarily system in which the method for dynamically optimizing the memory use in a digital recording device may be employed.

Referring to the Figures, wherein like elements are denoted by like find numbers, FIG. 1 illustrates an exemplarily system 100 in which the method for dynamically optimizing the memory use in a digital recording device may be employed. Specifically, FIG. 1 shows a digital imaging system featuring a digital camera 110, having a memory medium in the form of a removable memory card 120. While the exemplarily system 100 features the recording of digital images 105 saved as digital files 125, 124 on a memory card 120, the digitally recorded medium may be music, motion pictures, images or other recordable events or phenomena captured, converted and/or stored as digital files.

In the exemplarily system 100 of FIG. 1, a digital image 105 is captured by the digital recording device 110, and stored on a memory card 120 as a digital file 125. Other, previously captured images 124 are sequentially stored on the memory card 120 or other digital storage medium. The unused storage capacity of the digital memory card 120 is shown as empty or void space 122 on the card.

The recording device 110 features an interface (not shown) in which a user may preview or inspect the digital image files, and assign a priority to the digital image files for later use in manipulating and determining the ultimate disposition of the digital file once the remaining memory capacity becomes an issue or otherwise approaches a predetermined threshold. The rankings are preferably high priority, medium priority or low priority. High priority files are maintained at full resolution regardless of the available memory. Medium priority files are generally maintained at full resolution, but may be compressed as the memory resources of the recording device approach a predetermined threshold or become critical to make room for additional images or recordings. Low priority files are compressed as memory resources approach a predetermined threshold or become relevant and may be deleted when the device's memory resources approach a predetermined threshold or become critically low to make room for additional images or recordings. The thresholds at which the digital files are compressed or otherwise manipulated to conserve memory resources are preferably set by the user, however default or automatic settings may be employed. These thresholds may be set at a common value or may have different values.

The actual file compression may be performed by any number of commercially available file compression algorithms and is not a limiting factor in the scope of the disclosed system and method.

Figure 2:
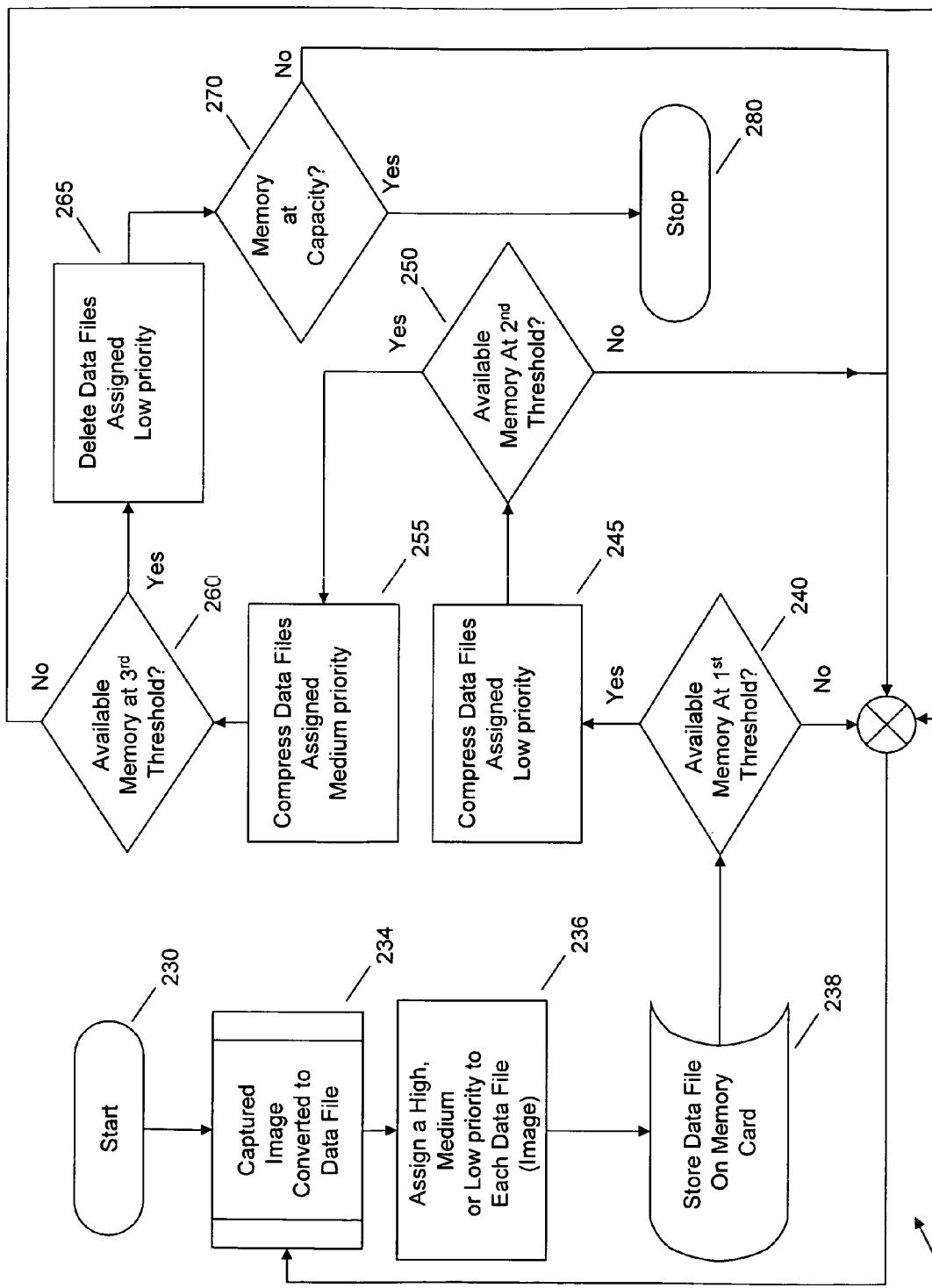
FIG. 2 illustrates an exemplarily flow chart for dynamically optimizing the memory use in a digital recording device where file compression is preferred over file deletion.

Referring now to FIG. 2 which shows an exemplarily flow chart for dynamically optimizing the memory use in a digital recording device 200 in which file compression is preferred over file deletion. In the exemplarily embodiment shown in FIG. 2 system employs the optimization method when an image is captured by the digital recording device and converted to a data file 234. Each data file for the converted images is assigned a priority of either high, medium or low 236 and the data file and priority ranking associated therewith is stored on a memory card 238. The priority assigned to the data file is designated by the operator of the recording device, however the priority may be assigned automatically based on a set of predetermined parameters specified by the user. The predetermined criteria on which the files are ranked may be based on the age of a recording, the sharpness of a recorded image, the brightness of an image, the fidelity of a recording or other parameter by which the user may be inclined to rank the files.

The system checks the amount of memory available to the recording device 240 for recording subsequent data and if the memory is determined to be below a predetermined threshold a compression algorithm is used to compress files assigned a low priority ranking 245. For example, if the first threshold is set at 70% capacity, once the available memory is determined to be below 30% the system employs a compression algorithm and compress stored data files that are assigned a low priority ranking to make room for additional digital recordings.

Generally, the process of file compression will reduce the available resolution and/or fidelity of the digital recording embodied in the compressed data file on subsequent playback. When the available memory is not below the predetermined threshold no compression is required, and all files are maintained at full fidelity and/or resolution. Additional captured images are converted into data files 234, assigned a priority ranking 236, and stored on the memory card 238 as customary.

With continued reference to FIG. 2, when the data files assigned a low priority are compressed 245, the system continually checks the amount of memory available to the recording device 250 for recording subsequent data and if the memory is determined to be below a second predetermined threshold a compression algorithm is again used this time to compress files assigned a medium priority ranking 255. For example, if the second threshold is set at 20% availability, once the available memory is determined to be at 80% capacity the system employs a compression algorithm and compress stored data files that are assigned a medium priority ranking to make room for additional digital recordings.

If the available memory does not fall below the second predetermined threshold no compression of the medium priority files is required, and high and medium priority files are maintained at full fidelity and/or resolution. Additional captured images are converted into data files 234, assigned a priority ranking 236, and stored on the memory card 238 as customary. If the available memory does not fall below the first predetermined threshold 240, as a result of the previous file compression activities, new recording designated as low priority files are compressed 245.

After the data files assigned low and medium priority are compressed 245, 255 the system continues to record additional digital files and continually monitors the amount of memory available to the recording device 240, 250 for recording subsequent data. If the memory resources available to the recording device are determined to be below a third threshold 260, files previously compressed files designated as low priority files are deleted 265 to make room for additional recordings. For example, if the third threshold is set at 10% availability, once the available memory is determined to be at 90% capacity and system has employed compression algorithms to compress stored data files that are assigned a low and medium priority rankings, the low priority files are simply deleted to make room for additional digital recordings.

Additional captured images are converted into data files 234, assigned a priority ranking 236, and stored on the memory card 238 as customary. If the available memory does not fall below the first or second predetermined thresholds 240, 250, from the deletion of low priority files, new recording designated as medium priority are compressed 255 and new recording designated low priority files are deleted 265. High priority files are maintained a full resolution regardless of the memory availability. The digital recording device generally remains in this mode until the remaining memory available is depleted.

Figure 3:
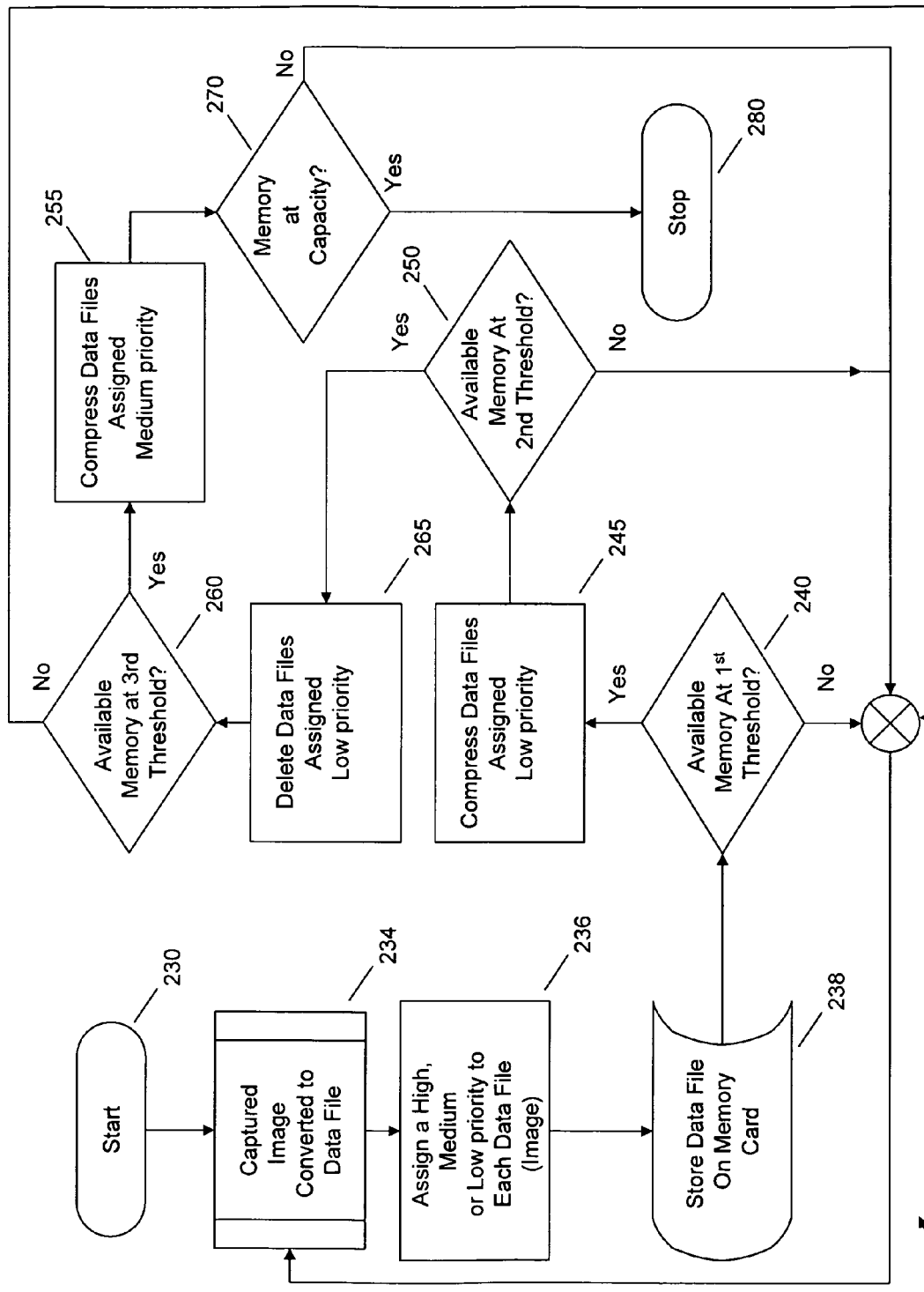
FIG. 3 illustrates an exemplarily flow chart for dynamically optimizing the memory use in a digital recording device where low priority files are deleted prior to the compression of medium priority files.

Referring now to FIG. 3 which shows an exemplarily flowchart for dynamically optimizing the memory use in a digital recording device 300 in which file deletion is preferred over file compression. In the exemplarily flowchart of FIG. 3, the system employs the optimization method when an image is captured by the digital recording device and converted to a data file 234. Each data file for the converted images is assigned a priority of either high, medium or low 236 and the data file and priority ranking associated therewith is stored on a memory card 238 as in FIG. 2.

The system checks the amount of memory available to the recording device 240 for recording subsequent data and if the memory is determined to be below a predetermined threshold a compression algorithm is used to compress files assigned a low priority ranking 245. The embodiment illustrated in FIG. 3 differs from the embodiment illustrated in FIG. 2 in that at the second predetermined threshold data files assigned a low priority are deleted 265, and medium priority files are maintained at full resolution or fidelity until the available memory passes a third predetermined threshold 260 at which point the medium priority files are compressed 255. High priority files are maintained a full resolution regardless of the memory availability.

In yet another embodiment the system may be configured to compress only low priority and medium priority files at one or more predetermined threshold. In yet another embodiment the system only compress low priority files at a predetermined threshold. Medium and High priority files are maintained a full fidelity.

Although the figures and discussion above are directed to memory optimization in a digital camera using a digital memory card, the present invention may also be used to optimized in any digital recording device employing a memory card or other memory means.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method of optimizing memory use in a digital recording device, said method comprising:
   sequentially recording a plurality of digital files collected by said digital recording device on a memory card;
   assigning each file of said plurality of digital files one of a high priority ranking, a medium priority ranking, and a low priority ranking based on at least one predetermined criteria;
   recording additional digital files on said memory card;
   compressing the files assigned the low priority ranking when the recording medium reaches a first predetermined threshold of the memory card's total storage capacity;
   compressing the files assigned the medium priority ranking when the recording medium reaches a second predetermined threshold in the memory card's total storage capacity; and
   deleting the files assigned the low priority ranking when the recording medium reaches a third predetermined threshold after reaching the first predetermined threshold in the memory card's total storage capacity.

2. The method of claim 1 wherein said first predetermined threshold in the memory card's total storage capacity is the same as said second predetermined threshold in the memory card's total storage capacity.

3. The method of claim 2 wherein said second predetermined threshold in the memory card's total storage capacity is the same as said third predetermined threshold in the memory card's total storage capacity.

4. The method of claim 3 further comprising the method step of deleting files assigned as medium priority files when the recording medium reaches a fourth predetermined threshold in the memory card's total storage capacity.

5. The method of claim 3, wherein the files assigned a low priority ranking are compressed prior to deletion.

6. A system for dynamically optimizing memory use in a digital recording device comprising:
   a digital recording device coupled to a digital recording memory medium wherein said digital recording device captures recordable phenomena and converts said captured recordable phenomena into digital data, and stores said digital data on said digital recording memory medium as a plurality of digital files;
   wherein said digital recording device assigns each file of said plurality of digital files one of a high priority ranking, a medium priority ranking, and a low priority ranking based on at least one predetermined criteria, said digital recording device captures additional recordable events, and stores additional digital files on said digital recording memory medium, and compresses the files assigned the low priority ranking when said digital recording memory medium reaches a first predetermined threshold of said digital recording memory medium's total storage capacity, and said digital recording device compresses the files assigned the medium priority ranking when said digital recording memory medium reaches a second predetermined threshold in said digital recording memory medium's total storage capacity, and when said digital recording memory medium reaches a third predetermined threshold after reaching the first predetermined threshold in said digital recording memory medium's total storage capacity the system deletes the files assigned the low priority ranking.

7. The system of claim 6 wherein said digital recording device is a camera.

8. The system of claim 6 wherein said digital recording device is an audio recording device.

9. The system of claim 6 wherein said first predetermined threshold of said digital recording memory medium's total storage capacity and said second predetermined threshold of said digital recording memory medium's total storage capacity are the same.

10. The system of claim 6 wherein said second predetermined threshold of said digital recording memory medium's total storage capacity and said third predetermined threshold of said digital recording memory medium's total storage capacity are the same.

11. A computer program product resident on a computer controlled digital recording device comprising a non-transitory computer useable medium including a computer readable program, wherein the computer readable program when executed on a computer controlled digital recording device causes the computer controlled digital recording device to:

sequentially record a plurality of digital files collected by said digital recording device on a memory card;

assign each file of said plurality of digital files one of a high priority ranking, a medium priority ranking, and a low priority ranking based on at least one predetermined criteria;

record additional digital files on said memory card;

compress the files assigned the low priority ranking when the recording medium reaches a first predetermined threshold of the memory card's total storage capacity;

compress the files assigned the medium priority ranking when the recording medium reaches a second predetermined threshold in the memory card's total storage capacity; and delete the files assigned the low priority ranking when the recording medium reaches a third predetermined threshold after reaching the first predetermined threshold in the memory card's total storage capacity.

12. The computer program product of claim 11 wherein said first predetermined threshold in the memory card's total storage capacity is the same as said second predetermined threshold in the memory card's total storage capacity.

13. The computer program product of claim 11 wherein said second predetermined threshold in the memory card's total storage capacity is the same as said third predetermined threshold in the memory card's total storage capacity.

14. The computer program product of claim 11 wherein the computer readable program when executed on a computer controlled digital recording device causes the computer controlled digital recording device to delete files assigned as medium priority files when the recording medium reaches a fourth predetermined threshold in the memory card's total storage capacity.

* * * * *